United States Patent [19]

O'Hare

[11] Patent Number: 4,551,978
[45] Date of Patent: Nov. 12, 1985

[54] BIMETALLIC SOLAR ENGINE

[76] Inventor: Louis R. O'Hare, 1700 Banyan #3, Fort Collins, Colo. 80526

[21] Appl. No.: 404,449

[22] Filed: Aug. 2, 1982

[51] Int. Cl.⁴ .............................................. F03G 7/02
[52] U.S. Cl. .................................. 60/641.13; 60/529; 60/641.8
[58] Field of Search ................. 60/527, 529, 530, 531, 60/641.11, 641.12, 641.8, 641.13

[56] References Cited

U.S. PATENT DOCUMENTS

| | | | |
|---|---|---|---|
| 1,777,000 | 9/1930 | Kasser | 60/529 |
| 3,070,953 | 1/1963 | Carrel | 60/529 |
| 3,339,077 | 8/1967 | Shapiro | 60/529 |
| 3,445,086 | 5/1969 | Quinn | 60/527 |
| 3,792,400 | 2/1974 | Hayes et al. | 60/529 X |
| 3,913,326 | 10/1975 | Banks | 60/527 |
| 4,033,126 | 7/1977 | Newland | 60/641.12 |
| 4,041,706 | 8/1977 | White | 60/527 |
| 4,397,151 | 8/1983 | Houlton | 60/527 |

FOREIGN PATENT DOCUMENTS 2508 of 1866 United Kingdom .................. 60/529

Primary Examiner—Stephen F. Husar

[57] ABSTRACT

The motion produced by a temperature change in a bimetallic element is used as a source of mechanical work energy in a way similar to the way that the bimetallic strip operates in a thermostat but in this thermal engine an array of massive bimetallic strips is repeatedly, alternately heated and cooled by a draft of air which draws first heated air and then cooled air over the bimetallic elements to thereby provide a continuous reciprocating action. In the principal embodiment the required draft is provided by a solar heated convection column which by means of valving draws air first from a solar collector and then from a cooling duct.

4 Claims, 12 Drawing Figures

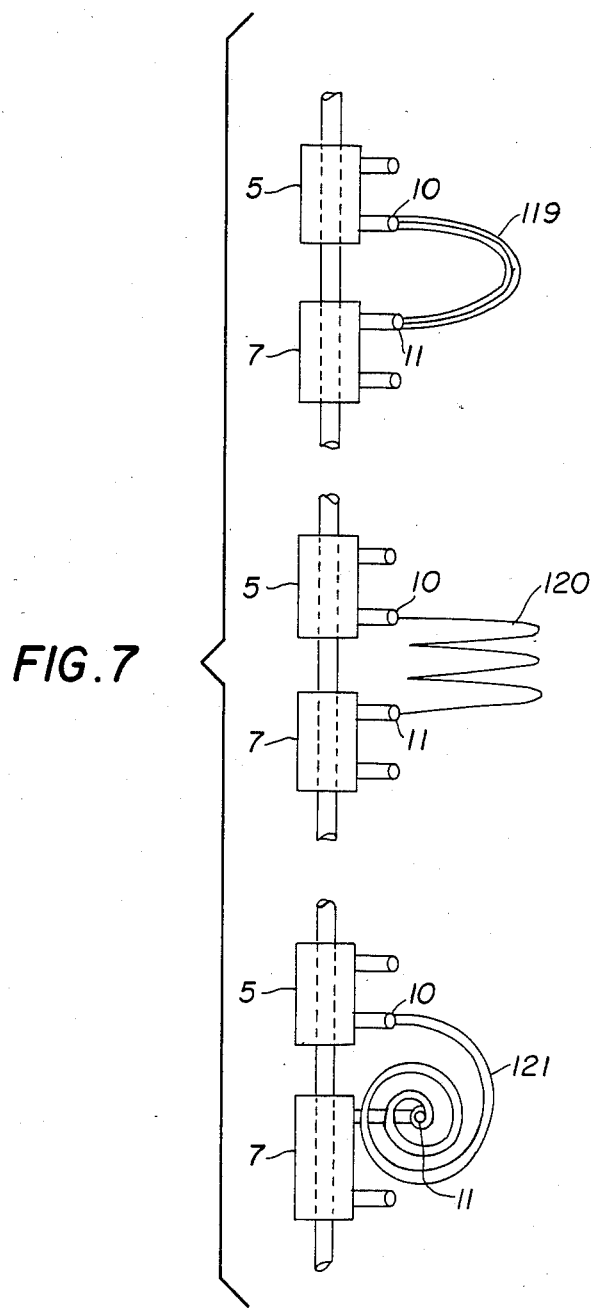

BIMETALLIC SOLAR ENGINE

This invention is a type of thermodynamic engine which is capable of converting heat energy into reciprocating motion. It is an engine which requires only low temperature differences in order to operate. In this engine the temperature differences between the higher temperature of a heat source such as a solar collector and the lower temperature of a heat sink such as a cooling duct placed in the earth are first converted into internal temperature alternations. This is accomplished by means of valving which alternates a heated and a cooled fluid flow. In turn the temperature alternations which result from first the heated and then the cooled fluid flows provide physical expansions and contractions of metallic elements which are linked together to provide reciprocating action with significant displacement. The temperature changes of the bimetallic elements themselves are provided by moving first the heated and then the cooled fluid across and in contact with these elements. The motive force required to move both types of fluid across the elements is principally the force of an energetic draft produced at the base of a solar heated convection column. By using a draft in this way this present invention closely resembles the art of my copending application called, "Convection Powered Solar Engine" of Ser. No. 184,205, now U.S. Pat. No. 4,453,382, because both this present invention and that copending application utilize some energy from a solar powered convection column to provide an energetic draft and the draft in both cases provides repeated temperature alternations by first drawing heated air and then by drawing cooled air across apparatus which convert temperature alternations into physical reciprocations. However the inventive concepts are different in that this present invention makes use of a quite different means of converting the temperature alternations into physical reciprocating action. In the former art cited the thermal expansion and contraction of a fluid, acting to provide pressurizations and depressurizations against a moveable surface, cause the surface to move in one direction under pressurization of the fluid and then to move in the opposite direction under depressurization. Whereas in this present invention the temperature alternations provide the opening and closing of bimetallic arches or other shapes which take place when soild materials are directly heated and cooled. This aspect of the invention closely resembles the prior art of some thermostatic control devices in which physical motion is produced by the expansion or the contraction of metallic elements. Just as some thermostats employ multiple strips of dissimilar metals joined along their lengths and then formed into a U-shape to provide a physical movement when heated or cooled so also this invention is based upon the principle that different metallic plates with different coefficients of expansion will interact to cause a bending effect when they are joined together along their lengths. Especially, when their joined lengths are bent into the shape of the letter U, then the thermal expansion or contraction of one metal plate relative to that of the other produces a widening or narrowing of the opening of the U shape. However, this invention differs from thermostat art in that the physical movement which is produced in this way in this present invention is not used to index temperature nor to move a control device correlative to a certain specific temperature, but rather here the physical movement is used as a part of a system of providing continual reciprocating energy.

Likewise, this invention is to be distinguished from the art of thermostatic control by its principal objective which is the utilization of abundant low grade thermal energy. The use of low grade thermal energy for the provision of physical work energy is often neglected because the temperature differences between the energy input into an engine and those leaving the engine are small and thereby indicate engine inefficiency. Nevertheless, even the use of an inefficient energy system is useful if the low temperature energy source is practically a free energy source. Since low grade, low temperature energy resources such as solar energy sources are abundant they can be made to provide much useful work energy for mankind if efficiency considerations are ignored. This invention seeks to provide an engine which is able to operate on solar and geothermal energy.

Another object of the invention is to provide an inexpensive, low technology engine. This object would make available for physical work the vast resource of low grade energy by providing a simple engine which could be easily constructed with low technology tools, skills and materials. This objective would provide for the use of simple black box solar collectors in conjunction with simple metalsmithing practice in order to make reciprocating power available where it is needed to drive a water pump for agricultural irrigation etc.

The ways in which these objectives are met in the various embodiments and the advantages are realized can be more clearly seen by referring to the drawings.

Figure 4:
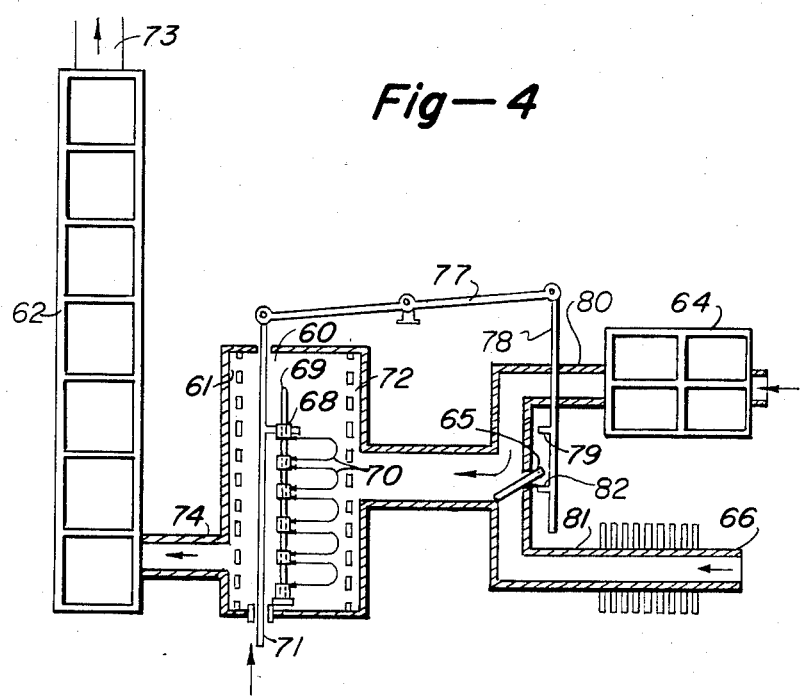

FIG. 4 of the drawings shows a valve switching means to alternately admit heated and then cooled air to the bimetallic elements.

Figure 5:
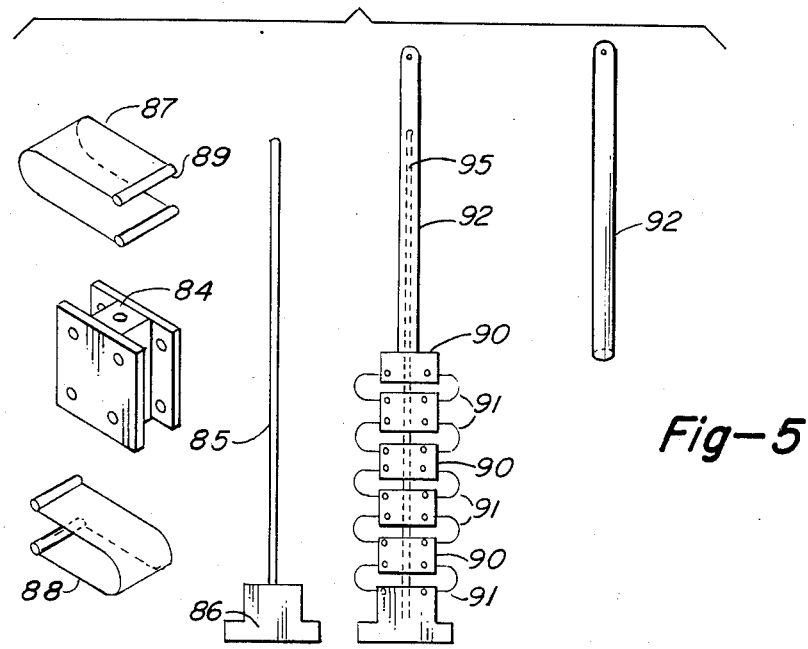

FIG. 5 shows bimetallic channel shaped elements and sliders and the manner they are supported on a single shaft.

Figure 6:
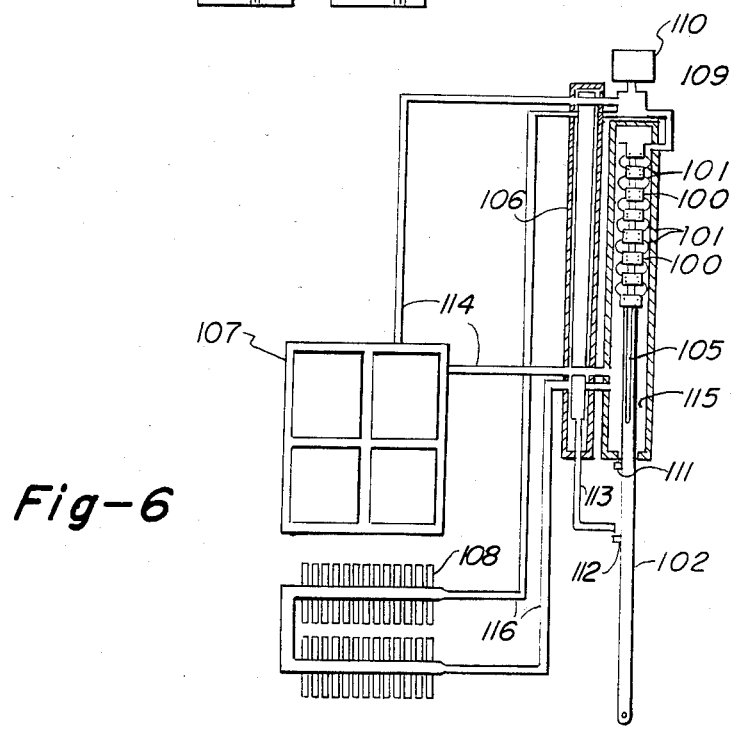

FIG. 6 shows a temperature alternation system with liquid heater and coolers and valves for hot and cold fluid flow over expandable bimetallic elements.

FIG. 7 shows alternate bimetallic shapes which may be used in place of the U shaped elements.

Figure 1A:
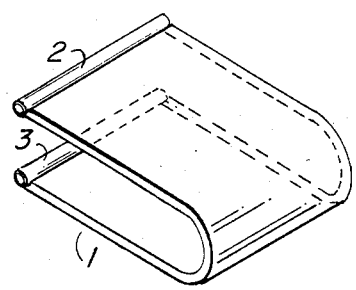
FIG. 1a shows a U-shaped bimetallic channel with bearings on its ends.

Referring then to FIG. 1a, the U shaped bimetallic element 1 is formed from two metal plates, with each plate having a different coefficient of expansion. The plates are positioned one on top of the other and with a flat surface of one plate being bonded to a flat surface of the other plate. While being held in this contact the plates are bent into the shape of the letter U. In this bending and according to the principal embodiment, the plate having the larger thermal coefficient of expansion is positioned on the inside of the bend and has the smaller bend radius of the two contiguous plates. In another embodiment the inner plate has a smaller thermal coefficient of expansion than the outer plate. Metal tubes are welded to the ends of the plates and these tubes serve as bearings 2 and 3 on which to support 1.

Figure 1D:
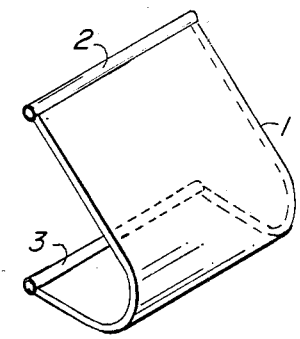
FIG. 1d shows a bimetallic channel in its open condition, expanded by temperature elevation.
Figure 1B:
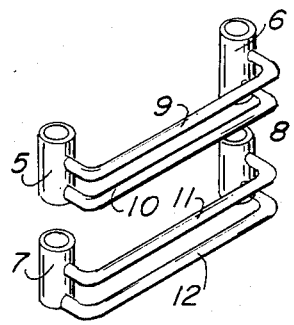
FIG. 1b shows four sliders supporting two shafts.

Referring then to FIG. 1b, the four sliders 5,6,7 and 8 are cylinders to which are attached shaft elements 9,10,11 and 12. The cylinder sliders 5 and 6 support shaft elements 9 and 10. Shaft elements 11 and 12 are supported by sliders 7 and 8.

Figure 1C:
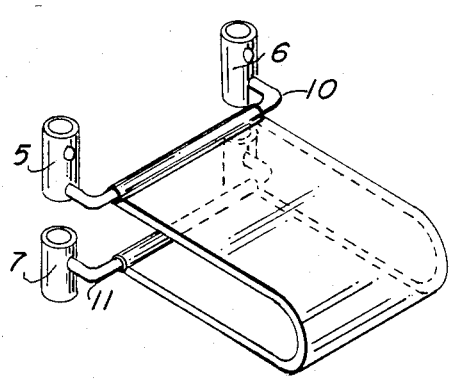
FIG. 1c shows a U-shaped bimetallic channel with its bearings supported on shafts connected to sliders.

In the FIG. 1c, the bimetallic element of FIG. 1a is shown being supported on shafts 10 and 11 which are the same as shafts 10 and 11 of FIG. 1b. The sliders in this FIG. 1c are the same as those of FIG. 1b.

Now in FIG. 1d, the same bimetallic element as the element of FIG. 1a is seen, but in this FIG. 1d the bimetallic element is shown in its expanded condition. In the principal embodiment this expanded condition is effected by the heating of the bimetallic element. In a secondary embodiment the expanded condition is effected by a cooling of the bimetallic element.

Figure 1E:
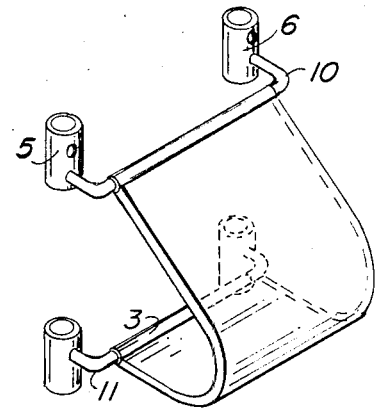
FIG. 1e shows a heat expanded channel that has moved sets of sliders apart.

In FIG. 1e the various components are the same as those of FIG. 1c except that the sliders 5 and 6 are now separated at a greater distance from sliders 7 and 8 because of the opening condition of the bimetallic element 1 which is the same as 1 of FIG. 1d.

Figure 2A:
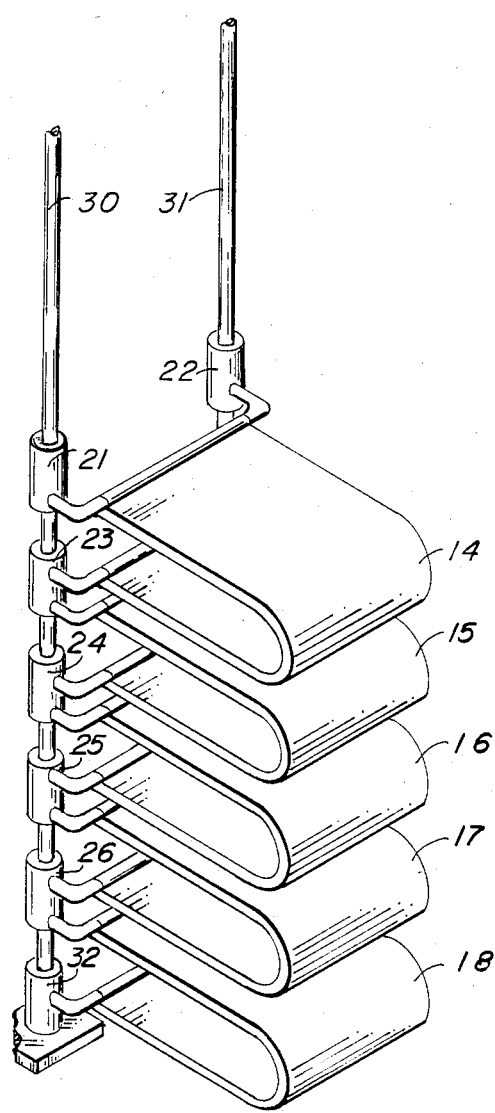
FIG. 2a shows an array of U-shaped channels each in a contracted condition.

Referring now to FIG. 2a, the array of U shaped channels 14,15,16,17 and 18 are all similar to the bimetallic element 1 of FIG. 1. Each element is supported by its own bearings and shafts as is 1 of FIG. 1. All of the sliders which are shown, namely sliders 21,22,23,24,25 and 26 can slide on guide rods 30 and 31 which are supported in base stand 32 and a counterpart base stand not shown because it is behind 18 in a drawing perspective.

Figure 2B:
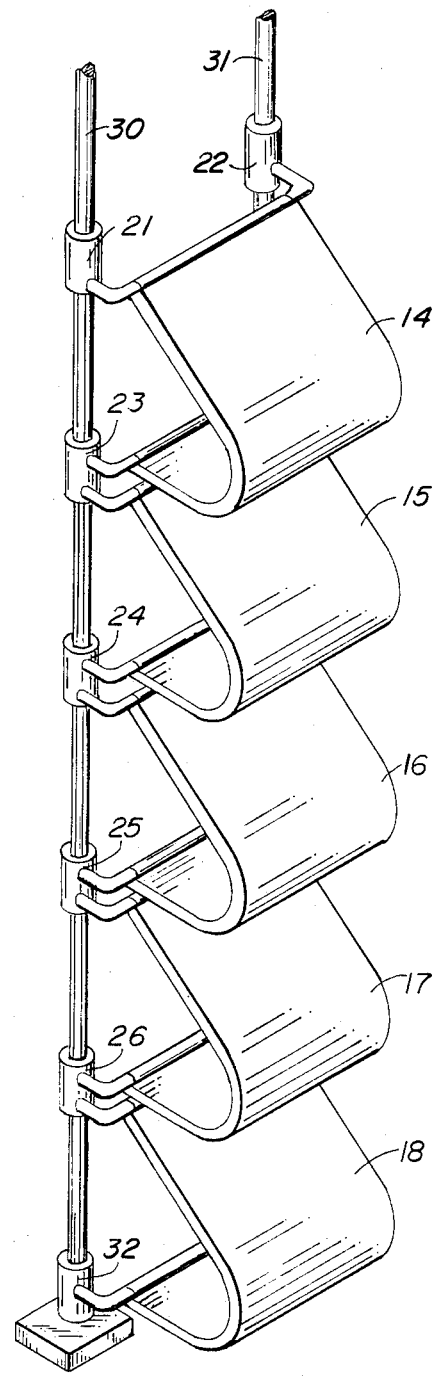
FIG. 2b shows an array of U-shaped channels each in an expanded condition in which the top sliders are significantly displaced upwards.

Referring now to FIG. 2b, the channels 14,15,16,17 and 18 are the same as those of FIG. 2a except that their relative positions have been changed by a temperature change. Each channel has a wider opening angle. The wider opening angle of each channel combined with the wider opening angle of each channel beneith it effects an upward movement of each slider. The sliders of this FIG. 2b are the same as those of FIG. 2a except that each is displaced upward. The total upward displacement of the uppermost pair of sliders is the result of all the upward displacements of the sliders beneith.

Figure 3:
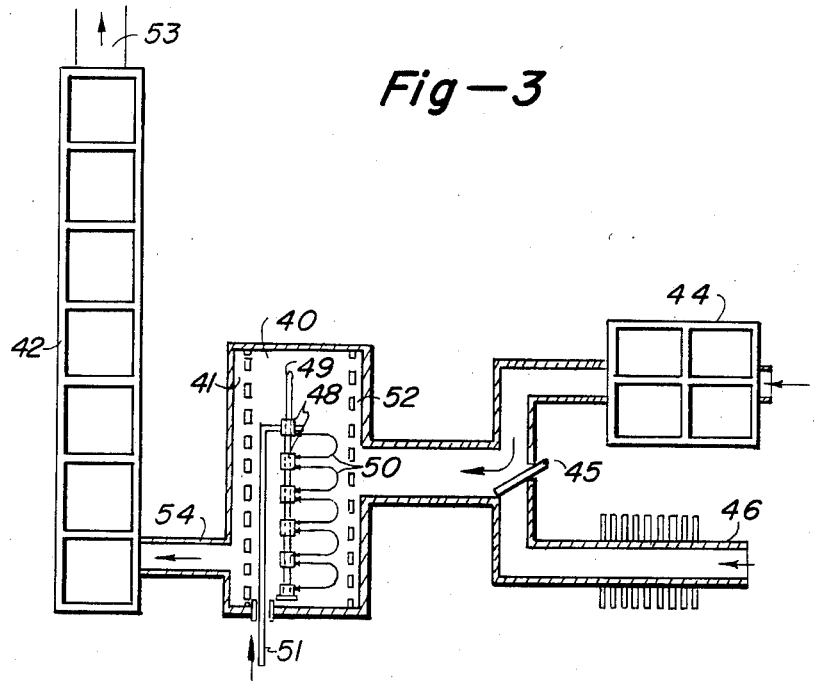
FIG. 3 is a diagram of a heating-cooling system with a solar heated convection column, a solar collector, a cooler and a housing with an array of heat expandable channels.

Referring to FIG. 3, temperature changes are effected in temperature alternation chamber 40 when low pressure produced in exit plenum 41 by a draft at the base of solar heated convection column 42 causes alternate fluid flows first from the black box solar collector 44 and then by means of valve 45 from cooling duct 46. The temperature in 40 rises when the draft from 42 draws heated air from the black box solar collector through 40 and the temperature decreases in 40 when the draft from 42 draws cool air from 46 through 40. The sliders 48 on guide pole 49 are displaced upward by the openings of bimetallic elements 50. As in the proceeding FIGS. the openings of the U shaped channels are effected by a temperature change. In the principal embodiment the temperature elevation causes an opening of the channels and a rise of the sliders 48. Subsequent cooling then causes a closing of the channels and a lowering of the sliders. Repeated temperature alternations produced by repeated cycling of valve 45 provide repeated reciprocations of sliders 48. The drive rod 51 attached to the uppermost slider is used to transmit the reciprocating energy from the sliders to any external reciprocating energy requirement such as a reciprocating water pump etc. The machines which use reciprocating energy are not shown as they are understood in the art. Entry plenum 52 in conjunction with exit plenum 41 provides for an even flow of both heating and cooling fluid through 40. The cooling duct 46 is able to provide cool air or other fluid by being located in a cool place such as a lake or a pond or by being placed in the earth etc. The solar heated convection column 42 is a rectangular black box solar collector of the type used for heating air. It is disposed with its length in an approximately vertical plane and it has upper and lower openings in order that the air heated within might rise and flow through the top opening 53 and thereby produce a draft through the opening at its base. In other embodiments 42 is cylindrical in shape with a transparent glaze along its length for approximately half of its circumference and with a light absorbing surface along its inner length on the other half of its circumference. The duct 54 provides fluid flow communication between 42 and 41. It is not intended to limit the inventive concept to any specific type of bimetallic element. In an alternate embodiment the cooling of the bimetallic elements opens the channels and causes the sliders to rise subsequent heating reverses the action. Alternate heating and cooling of the elements still produces the desired reciprocating action. Nor is it intended to limit the inventive concept to a certain given number of bimetallic elements, since any number may be used in a system of thermal alternations to provide reciprocating work energy.

Referring now to FIG. 4, most of the elements of this FIG. 4 are the same as those of FIG. 3. In FIG. 3 the elements 40, 41, 42, 44, 45, 46, 48, 49, 50, 51, 52, 53 and 54 are all respectively the same as the elements 60, 61, 62, 64, 65, 66, 68, 69, 70, 71, 72, 73 and 74 of FIG. 4. In this FIG. 4 a mechanism is shown for automatic cyclic of the temperalternation valve 45. When the bimetallic elements have opened close to their opening limits then lever operating rod 76 will be close to the limit of its upward travel thereby pivoting lever 77 to cause the valve control rod 78 to engage the valve 65 with cog 79. This action will close heating duct 80 and open cooling duct 81. In the cooling mode, when 76 has moved downward to a position close to the limits of its downward travel, then cog 82 will be moved upward to contact 65 and open 80 while closing 81. In this way ducts 80 and 81 will be repeatedly opened and closed alternately from each other providing alternate heating and cooling of temperature alternation chamber 60. In the embodiment in which cooling produces the opening rather than the closing of the bimetallic elements, then the relative positions of the heater 64 and the cooler 66 must be interchanged. In this configuration the duct 80 will be leading to the cooler 66 and 81 to heater 64. Duct 80 will then be closed to prevent further cooling and 81 opened to initiate heating at the position in upward travel of 76 as it approaches its limits of upward movement. The relative positions of this alternate embodiment are not shown as they are deduced by transposing two of the elements of the principal embodiment.

Referring to FIG. 5, sliding block 84 is provided with a hole through its vertical length for sliding on guide pole 85 which is supported in base stand 86. The bimetallic elements 87 and 88 are connected to block 84 by means of pins not shown extending through 84 and through the bearings 89 at the ends of 87. Multiple sliding blocks 90 (which are like sliding block 84) are linked by multiple bimetallic elements 91 to move actuator cylinder 92 up and down on guide pole 95 by means of heating and cooling of 91.

Now with reference to FIG. 6, the actuator cylinder 102 is like 92 of FIG. 5 and is caused to reciprocate by bimetallic elements 101 and sliding blocks 100 on guide rod 105. The heating and cooling of 101 is accomplished by the repeated actuating of valve 106 which admits alternately heated and then cooled liquid first from hydronic solar collector 107 and then from liquid cooler 108. Both hot and cold fluids air circulated by means of small pump 109 driven by electric motor 110. The cogs 111 and 112 on 102 engage valve actuating rod 113 as 102 is completing its stroke in either direction. Ducts 114 transport heated fluid to and from temperature alternation chamber 115. Ducts 116 transport cooling fluid to and from 115.

Referring to FIG. 7, the sliders 5 and 7 are shown in a diagramatic side view and these are the same as sliders 5 and 7 of FIG. 1c. The bimetallic element 1 is also the same in this FIG. 7 as the element 1 of FIG. 1c. In place of 1 in this FIG. 7 may be used the multiple bimetallic element 120 in order to achieve a greater opening of 5 and 7 under the influence of a temperature change. The multiple bimetallic element 120 is formed by the joining of many single bimetallic elements at their ends to form a series. The ends of the elements at the ends of the series are each terminated with a bearing like the bearings used along the ends of the bimetallic element 1 in FIG. 1 and are securred to shafts 10 and 11 in the same way by these bearings. The bimetallic spiral 121 is similar in design to those used in thermostats except that it is massive. It is formed from two strips of metal each with a different thermal coefficient of expansion from the other. The pieces of metal are joined along their flat surfaces and the resulting bimetallic strip is bent into the shape of a spiral in such a way that one of the two dissimilar metals will be always on the inside of the bends of the spiral and the other of the two metals is on the outside of the bending as the spiral is formed. A bearing is attached to the internal end of the spiral spring at right angles to the radii of the spiral and another bearing is attached to the outer end at the same angle. The inner bearing is attached to shaft 11 and the outer bearing to shaft 10. In this alternate embodiment temperature changes provide contractions and expansions of the spiral and reciprocations between 5 and 7.

While the source of heat energy is described as solar energy, it is not intended to limit the inventive concept to the use of solar energy alone and in other embodiments geothermal heat is used and the solar collector is replaced by ducting extending into the hot earth in order to heat air circulating in the ducting. Similarly, while a principal object of the invention is to provide a passive system and a solar powered draft is provided to achieve this objective, nevertheless it is not intended to limit the inventive concept to the use of a convection powered draft alone, and just as a liquid pump is described in FIG. 6 by pump 109 so an air pump is used in another embodiment in place of collector 42 of FIG. 3 to circulate both heating and cooling air. In this alternate embodiment for instance a centrifugal air blower or a radial fan is placed in the fluid flow circuit immediately before the temperature alternation chamber such as chamber 40 of FIG. 3. In this position the air blower draws heated air from collector 44 of FIG. 3 during one period impelling it through chamber 40 and then, when valve 45 changes air flow direction, the air blower draws cooler air through cooler 46 and impels it through chamber 40. In this way temperature alternations are provided in 40 to produce the reciprocations of the elements 50. The blower is not shown.

This engine is also capable of operating on stored energy and especially on stored solar-thermal energy. During periods of darkness or of lower solar radiation, a solar heat storage unit is employed in one embodiment to power the engine. In this embodiment, in the place of the draft of air being drawn through the solar black box collector (such as collector 44 of FIG. 3) air is drawn through a solar storage unit which has been previously heated by conventional solar storage heating means. The storage unit is not shown because solar heat storage means are well understood in the solar art, and the unit would occupy the position that solar collector 44 occupies in FIG. 3, and the solar heat storage unit then follows a solar black box collector and is downstream of the collector in order to be heated by a fluid flow from the collector.

Throughout the description of the bimetallic elements, the terms metallic plates and metallic strips are used to describe the components of the bimetallic elements. These terms are intended to include metal alloys as well as elemental metals. Thus a bimetallic element with a heavy strip of brass bonded to a heavy strip of copper would provide a suitable bimetallic element.

I claim:

1. A solar heat engine comprising:

a source of heated air provided by a hot air solar collector, a source of cool air provided by a finned air duct situated in a low temperature region, a thermal energy converter comprising a plurality of thermally responsive curved bimetallic elements, each of said elements having both ends attached to moveable sliders which slide along at least one guide rod, said bimetallic elements being mounted on said at least one guide rod in a serial manner with one end of the first of said bimetallic elements being fixed such that heating and cooling the serially arranged bimetallic elements produces a compound reciprocable movement, and a drive rod attached to an end opposite said fixed end so that said reciprocable movement may be coupled to an external load, means for supplying alternate drafts of air from said sources of heated and cool air across said thermal energy converter comprising a solar heated thermal convection column connected in fluid flow communication with one end of said thermal energy converter and a switching valve in fluid flow communication with the opposite end of said thermal energy converter, said switching valve alternating the fluid flow communication between said sources of heated and cool air and said thermal convection column such that the draft created in said thermal convection column draws air alternately from said sources across said thermal energy converter producing a reciprocating movement in said drive rod.

2. A solar heat engine as set forth in claim 1 in which said switching valve is operatively connected to said thermal energy converter in such a manner that the fluid flow of heated and cool air is switched near the point of maximum travel of said reciprocating movement.

3. A solar heat engine as set forth in claim 1 in which said bimetallic elements are U-shaped.

4. A solar heat engine as set forth in claim 1 in which said bimetallic elements are spirally shaped.

* * * * *